United States Patent
Ros et al.

(10) Patent No.: US 9,770,882 B2
(45) Date of Patent: *Sep. 26, 2017

(54) HONEYCOMB STRUCTURE ELEMENT

(71) Applicant: REP IP AG, Oberwil bei Zug (CH)

(72) Inventors: Nico Ros, Basel (CH); Fritz Ganser, Riehen (CH)

(73) Assignee: REP IP AG, Zug (CH)

(*) Notice: Subject to any disclaimer, the term of this patent is extended or adjusted under 35 U.S.C. 154(b) by 0 days.

This patent is subject to a terminal disclaimer.

(21) Appl. No.: 15/404,954

(22) Filed: Jan. 12, 2017

(65) Prior Publication Data
US 2017/0120553 A1   May 4, 2017

Related U.S. Application Data

(63) Continuation of application No. 13/395,847, filed as application No. PCT/CH2010/000220 on Sep. 15, 2010, now Pat. No. 9,579,866.

(30) Foreign Application Priority Data

Sep. 15, 2009  (CH) ..................... 1420/09

(51) Int. Cl.
*B32B 3/12* (2006.01)
*B32B 7/04* (2006.01)
*B32B 7/12* (2006.01)
*B32B 3/28* (2006.01)

(52) U.S. Cl.
CPC .......... *B32B 3/12* (2013.01); *B32B 3/28* (2013.01); *B32B 7/045* (2013.01); *B32B 7/12* (2013.01); *B32B 2305/024* (2013.01)

(58) Field of Classification Search
None
See application file for complete search history.

(56) References Cited

U.S. PATENT DOCUMENTS

| | | |
|---|---|---|
| 3,086,899 A | 4/1963 | Smith et al. |
| 4,533,583 A | 8/1985 | May |
| 4,631,221 A | 12/1986 | Disselbeck et al. |
| 5,270,092 A | 12/1993 | Griffith et al. |
| 5,894,045 A | 4/1999 | Desrondiers |
| 6,029,962 A | 2/2000 | Shorten et al. |
| 7,721,404 B2 | 5/2010 | Park |
| 7,998,389 B2 | 8/2011 | Burchett et al. |
| 2001/0012812 A1 | 8/2001 | Spengler |
| 2006/0080941 A1 | 4/2006 | Ishii et al. |
| 2006/0177635 A1 | 8/2006 | Pepe et al. |
| 2007/0251170 A1 | 11/2007 | Uhlig et al. |

(Continued)

FOREIGN PATENT DOCUMENTS

| | | |
|---|---|---|
| CN | 1755044 A | 4/2006 |
| CN | 1827485 A | 9/2006 |

(Continued)

*Primary Examiner* — David Sample
*Assistant Examiner* — Nicholas W Jordan
(74) *Attorney, Agent, or Firm* — The Webb Law Firm

(57) ABSTRACT

A honeycomb structure element including an at least partially closed honeycomb structure, which is formed by joining at least two structured layers having honeycomb cells that are open on one side. A method for manufacturing a honeycomb structure element including forming an at least partially closed honeycomb structure by joining at least two structured layers having honeycomb cells that are open on one side.

12 Claims, 8 Drawing Sheets

(56) References Cited

U.S. PATENT DOCUMENTS

| | | |
|---|---|---|
| 2008/0075917 A1 | 3/2008 | Park |
| 2008/0292898 A1 | 11/2008 | Straza |
| 2012/0015139 A1 | 1/2012 | Baker |
| 2014/0117026 A1 | 5/2014 | Ros et al. |

FOREIGN PATENT DOCUMENTS

| | | |
|---|---|---|
| CN | 1905963 A | 1/2007 |
| CN | 101052486 A | 10/2007 |
| DE | 4114506 A1 | 11/1992 |
| EP | 0153681 A2 | 9/1985 |
| EP | 0465719 A2 | 1/1992 |
| GB | 2220612 A | 1/1990 |
| WO | 2005/028138 A1 | 3/2005 |
| WO | 2006/049406 A1 | 5/2006 |

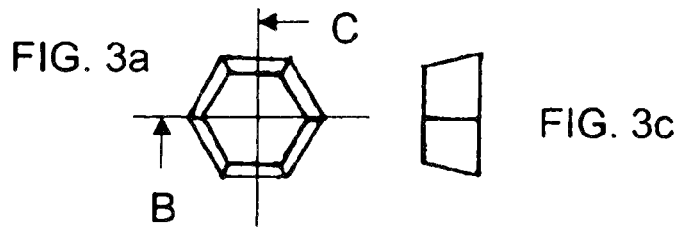
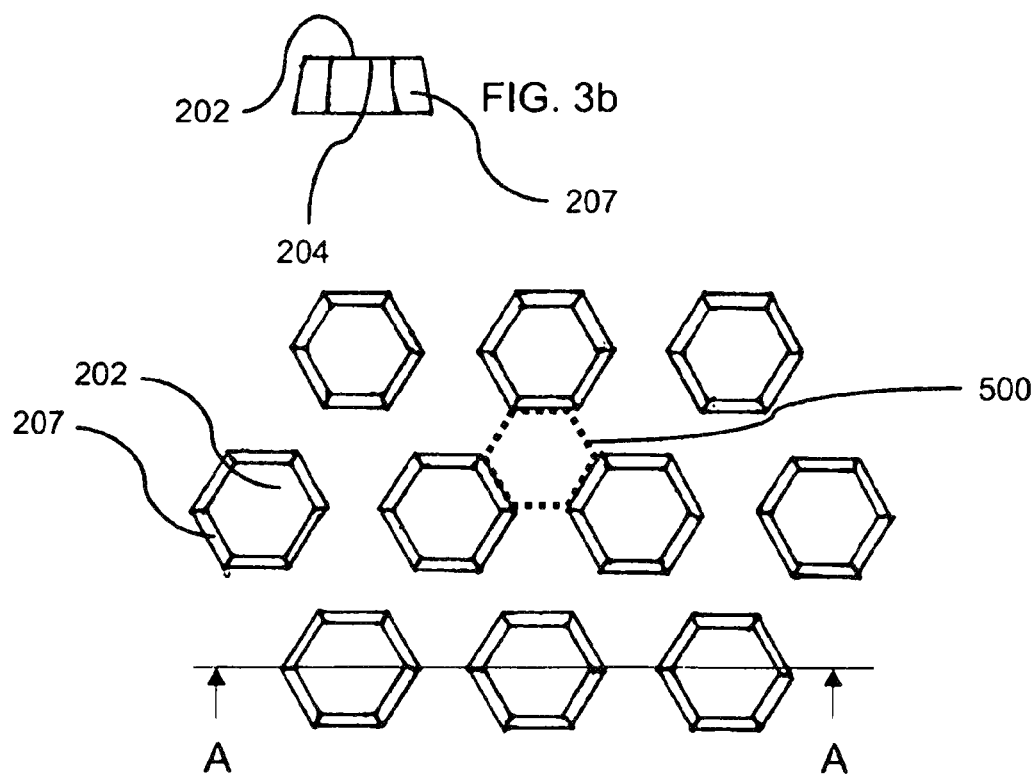
FIG. 4a
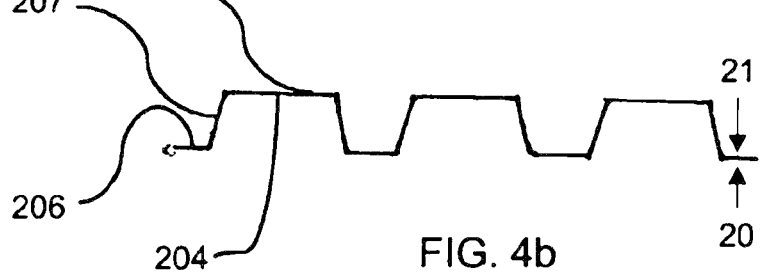
FIG. 4b

HONEYCOMB STRUCTURE ELEMENT

CROSS REFERENCE TO RELATED APPLICATIONS

This application is a continuation of U.S. Pat. No. 9,579,866, issued on Feb. 28, 2017, which is the U.S. national phase of International Application No. PCT/CH2010/000220, filed Sep. 15, 2010, and claims priority to CH 1420/09, filed Sep. 15, 2009, the disclosures of which are hereby incorporated in their entirety by reference.

BACKGROUND OF THE INVENTION

Field of the Invention

The invention relates to a honeycomb structure element having an at least partially closed honeycomb structure, which is formed by joining at least two structured layers having honeycomb cells that are open on one side. The invention further relates to a method for manufacturing such a honeycomb structure element.

Description of Related Art

Technology has long since already made use of materials having a honeycomb structure, e.g., in the form of panels to which the honeycomb structure imparts stability, among other things. Such panels are used both as load-bearing structures and for insulation purposes. Also known are films, e.g., aircushion films, which are used for insulation and packaging purposes. For example, EP-A-0465719 describes a flat object having a honeycomb structure and a method for its manufacture, in which honeycomb cells are covered on one side (or both sides) by a plate or film softened by heat, which is then cooled again under suction or pressure, thereby forming a honeycomb structure closed on one side (or both sides).

U.S. Pat. No. B-5,270,092 describes an insulating panel consisting of a multi-layer polymer material, with essentially closed structural cavities, thereby minimizing heat transport through the panel, in particular by convection. At least part of the panel is further provided with a layer having a low level of emission to minimize heat transport via infrared radiation.

EP-A-0153681 describes a method for manufacturing three-dimensional, translucent honeycomb structures made out of plastics, in which plastic films or plates are thermo-formed (hot formed or deep drawn) to fabricate ribbed structures, the mechanical strength of which is then increased by adhesively bonding, welding or hot sealing the ribbed depressions by way of a film or one to the other. In order to protect against external influences, the one or both outer surfaces of the transparent honeycomb structures manufactured in this way can be covered, adhesively bonded or sealed with a transparent plate or film. The heat-insulating property of the three-dimensional honeycomb structure can be enhanced by filling the ribbed depressions or entire translucent honeycomb structure with a gas having a high molecular weight.

DE-A-4114506 describes an aircushion film especially for packagings, which consists of two film webs made out of a weldable or sealable material and joined together in a prescribed pattern by means of welded or sealed seams, forming air- or gas-filled cushions. Structuring the two film webs via deep drawing yields truncated pyramid shapes with a rectangular base, which each end in an inner square with a smaller surface. The two film webs are each joined together with the two sides facing away from the respective deep drawing side in such a way that the film web shapes lie opposite each other, and the sealing surface is the respective side of the film webs facing away from the deep drawing side.

SUMMARY OF THE INVENTION

Therefore, an object of the invention is to provide an alternative or improved honeycomb structure with closed honeycomb cells, as well as a method for its manufacture.

This object is achieved by the honeycomb structure element as disclosed herein, as well as by the method for manufacturing such a honeycomb structure element.

The present invention resolves several problems associated with the honeycomb structure elements known from the prior art and their production methods. In particular, the honeycomb structure elements of the present invention can be manufactured using a simple and inexpensive method, exhibit an at least partially closed honeycomb structure already without additional cover layers, and are gastight and dimensionally scalable. In particular, the honeycomb structure elements of the present invention exhibit large support surfaces, which facilitate the bonding of layers, in particular adhesive bonding or welding, and improve the gas tightness of the individual honeycomb cells.

In a preferred embodiment of the invention involving the use of additional cover layers, essentially all honeycomb cells are closed except for the edges of the honeycomb structure element.

The present invention relates to a honeycomb structure element comprising at least two layers that are bonded together to form an at least partially closed honeycomb structure. The two layers are preferably complementary layers, i.e., the structures (e.g., elevations) of the one layer engage into the structures (e.g., depressions) of the other layer in such a way that a superposed (secondary) structure forms when the layers are joined together.

One of the two layers bonded together is here a first structured layer with honeycomb cells open on one side, and the other layer is a second structured layer with honeycomb cells open on one side, wherein it can be structured identically or differently to the first layer. Both structured layers are preferably structured identically. The structuring of these two layers will also be referred to below as the primary structure.

When joined and bonded together (i.e., as a secondary structure), the two layers form an at least partially closed honeycomb structure. The two layers are here preferably joined together in such a way that the openings of the honeycomb cells of the first structured layer point away from the second structured layer, and the openings of the honeycomb cells of the second structured layer point away from the first structured layer. In other words, the openings of the primary structures of both structured layers are preferably oriented toward the outside of the honeycomb structure element.

The structured layers of the primary structure are preferably comprised of deep-drawn films. It is especially preferred that the two structured layers be identical and formed out of the same deep-drawn film.

The honeycomb cells of the primary structure open on one side are preferably depressions with an essentially hexagonal footprint. "Essentially hexagonal" also encompasses shapes which have the geometric properties of a hexagonal footprint before being joined and/or bonded together, but can no longer be recognized as completely hexagonal owing to processes involved in joining and/or bonding together the layers to form the secondary honeycomb cells. The depressions that form the primary honeycomb cells open on one side preferably have a hexagonal footprint, with a hexagonal equilateral footprint being especially preferred.

As a result of the configuration described above, at least one third of the honeycomb cells are preferably closed (secondary) honeycomb cells, except for the edge regions of the honeycomb structure element, after being joined together.

The honeycomb cells open on one side preferably have wall surfaces that are essentially quadrangular. "Essentially quadrangular" here encompasses trapezoidal, rhomboid or rectangular. "Essentially quadrangular" here also encompasses shapes which have the geometric properties of a quadrangular footprint before being joined and/or bonded together, but can no longer be recognized as completely quadrangular owing to processes involved in joining and/or bonding together the layers to form the secondary honeycomb cells. The depressions that form the primary honeycomb cells open on one side preferably have rectangular or trapezoidal wall surfaces, with trapezoidal wall surfaces being especially preferred.

In a preferred honeycomb structure element, the open honeycomb cells of at least one of the two structured layers, preferably of both structured layers, are each sealed by an outer flat layer. This outer flat layer is preferably formed by a flat film, with a film also used to manufacture the structured layers being especially preferred. The two structured layers can here each be sealed with different flat layers. The flat layers are preferably comprised of the same film.

As a result of the configuration described above, all honeycomb cells of the honeycomb structure element are preferably closed after being joined together, except for the edge regions of the honeycomb structure element.

In addition to the first and second structured layer, i.e., the first pair of structured layers or the first dual layer, the honeycomb structure element described above can further comprise additional structured layers bonded thereto, individual or paired structured layers (i.e., second and more dual layers). In addition to the first and second structured layers sealed with the outer flat layers, i.e., the first pair of structured layers closed with cover layers or the first sealed dual layer, the honeycomb structure element described above can comprise additional structured layers bonded thereto, individual or paired structured layers, or other structured layers sealed with outer flat layers and bonded thereto (i.e., second and more sealed dual layers).

Such a honeycomb structure element preferably comprises two or several dual layers of structured layers with or without cover layers. It is especially preferred for such a honeycomb structure element to comprise two or several dual layers bonded together, each with corresponding cover layers.

In a honeycomb structure element according to the invention, both the closed honeycomb cells obtained by joining together the structured layers (secondary structure) and the honeycomb cells of the structured layers themselves that are open on one side (primary structure) and sealed by the outer flat layers (cover layers) exhibit essentially the same shape. In other words, the closed honeycomb cells have an essentially hexagonal footprint and wall surfaces that are essentially quadrangular. The aforesaid applies with respect to the designations "essentially hexagonal" and/or "essentially quadrangular".

In a further development of the present invention, proceeding from their basic form, i.e., a simple depression, the honeycomb cells are preferably provided with a counter-depression that serves to further subdivide the honeycomb volume.

The present invention further relates to a method for manufacturing a honeycomb structure element in which the honeycomb cells of the layers are deep-drawn by means of a vacuum, preferably with a tool, and the layers are bonded with each other after being joined together. The layers are preferably joined and/or bonded together under a vacuum, in the air or in a gas atmosphere.

The layers are preferably adhesively bonded or welded together. The person skilled in the art is familiar with the usual methods for joining layers, in particular plastics, specifically films.

Adhesive bonding here encompasses all methods in which a connection is established between the joined layers with an additional material, e.g. via glue, adhesives, solder or 2-component systems, etc.

Welding here encompasses all methods in which a connection is established between the joined layers without an additional material, e.g., via hot sealing, etc.

A honeycomb structure element according to the invention is preferably fabricated out of plastic, metal or glass, with plastic being especially preferred. Suitable plastics include polyolefins, such as polypropylene (PP) or polyethylene (PE), polyamides, such as Nylon-6 or Nylon-6,6, polyurethanes (PU), polystyrene (PS), polyvinylchloride (PVC) or polyester, such as polyethylene terephthalate (PET).

In an alternative embodiment of the method for manufacturing a honeycomb structure element according to the invention, the corresponding layers are already arranged under a vacuum and/or at least tightly bonded under a vacuum, thereby giving rise to closed vacuum cells. In an alternative embodiment, the honeycomb cells can here further be provided with a corresponding support structure (e.g., by coating or filling the honeycomb cells).

If necessary, the gas pressure inside the closed vacuum cells can also be reduced after the corresponding layers have been bonded in a gastight manner via chemical reaction in already closed vacuum cells, cooling or chemical bonding.

In another alternative embodiment of the method for manufacturing a honeycomb structure element according to the invention, the corresponding layers are arranged in air or under a gas atmosphere (e.g., a nitrogen or inert gas atmosphere), and bonded gastight with the inclusion of the air or corresponding gas, thereby giving rise to closed honeycomb cells. If necessary, the gas pressure inside the closed honeycomb cells can be reduced and/or elevated after the corresponding layers have been bonded in a gastight manner, e.g., via chemical reaction in the already closed honeycomb cells, or via chemical bonding.

BRIEF DESCRIPTION OF THE DRAWINGS

The invention will be explained in more detail below based on exemplary embodiments, drawing reference to the attached drawings. It is shown:

FIG. 3a a top view of a hexagonal honeycomb cell of another exemplary embodiment of the invention;

FIG. 3b a sectional view of the honeycomb cell of FIG. 3a along line B;

FIG. 3c a sectional view of the honeycomb cell of FIG. 3a along line C;

FIG. 4a a top view of a layer of a honeycomb structure element of another exemplary embodiment of the invention with hexagonal honeycomb cells;

FIG. 4b a sectional view of the layer of honeycomb cells of FIG. 4a along line A-A;

DETAILED DESCRIPTION OF THE INVENTION

Figure 1:
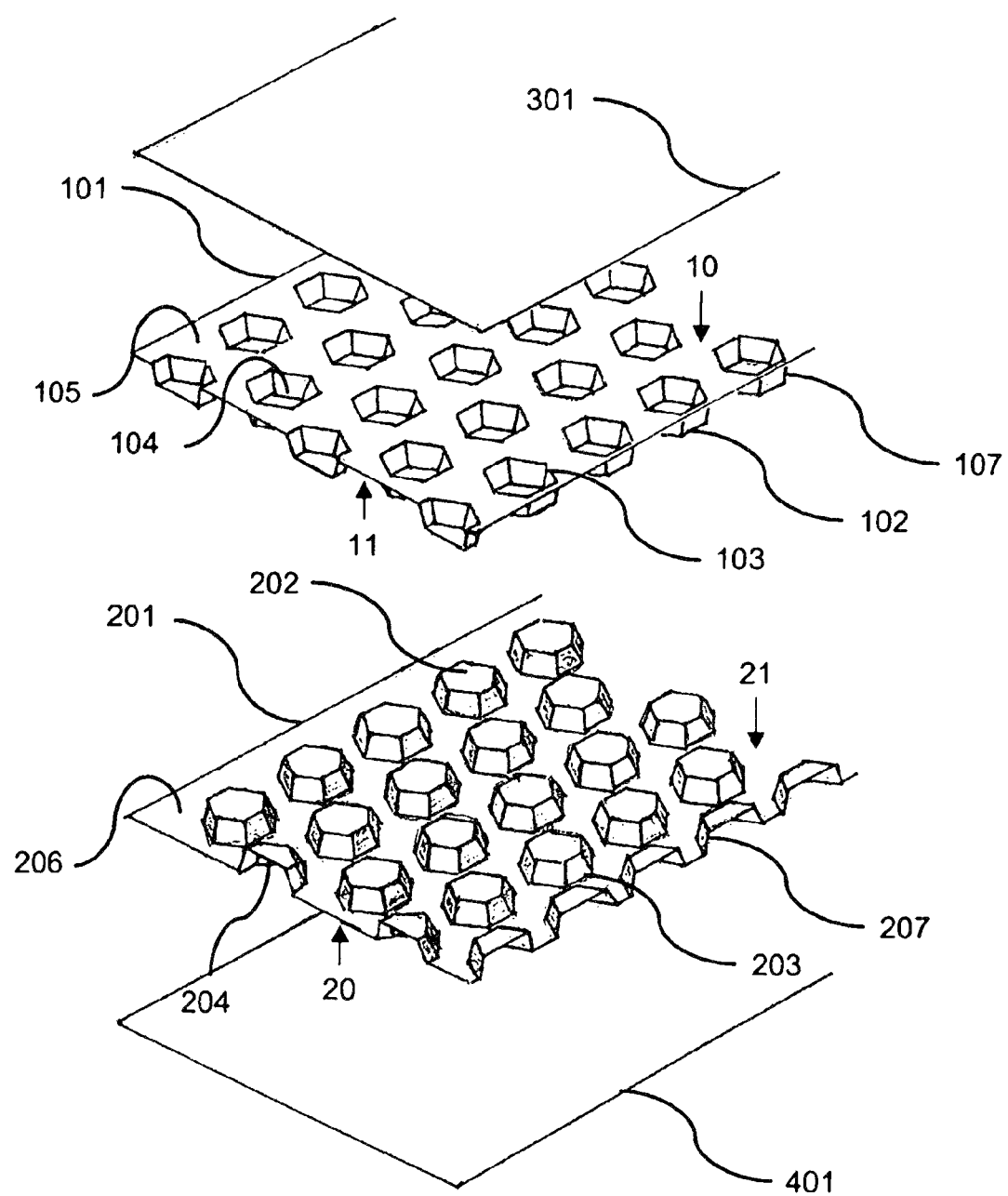
FIG. 1 a first exemplary embodiment of the honeycomb structure element according to the invention, comprising two layers, as well as a second exemplary embodiment of the honeycomb structure element according to the invention, comprising four layers.

FIG. 1 shows a first exemplary embodiment of a honeycomb structure element in its individual parts, comprising two layers 101 and 201. The first layer 101 is a layer with depressions in the form of honeycomb cells 104 open on one side, whose edge shape 103 in the layer plane 105 is just as hexagonal as at the end of the depression 104, i.e., on its footprint 102. The wall surfaces 107 of the depressions 104 are essentially quadrangular, preferably trapezoidal, and essentially perpendicular in relation to the layer plane 105, preferably slightly inclined. The second layer 201 is a layer with depressions in the form of honeycomb cells 204 open on one side, whose edge shape 203 in the layer plane 206 is just as hexagonal as at the end of the depression 204, i.e., on its footprint 202. The wall surfaces 207 of the depressions 204 are essentially quadrangular, preferably trapezoidal, and essentially perpendicular in relation to the layer plane 206, preferably slightly inclined. The two sides further comprise planar surfaces 10 and 20 on the front side, as well as planar surfaces 11 and 21 on the rear side. For example, the side in which a depression is deep-drawn is referred to as the rear side. By contrast, the front side is the side that remains unchanged and flat, for example in the deep drawing process. FIG. 1 further shows a second exemplary embodiment comprising four layers, also in its individual parts. In addition to the two already described layers, this exemplary embodiment further comprises two flat layers 301 and 401.

Figure 2:
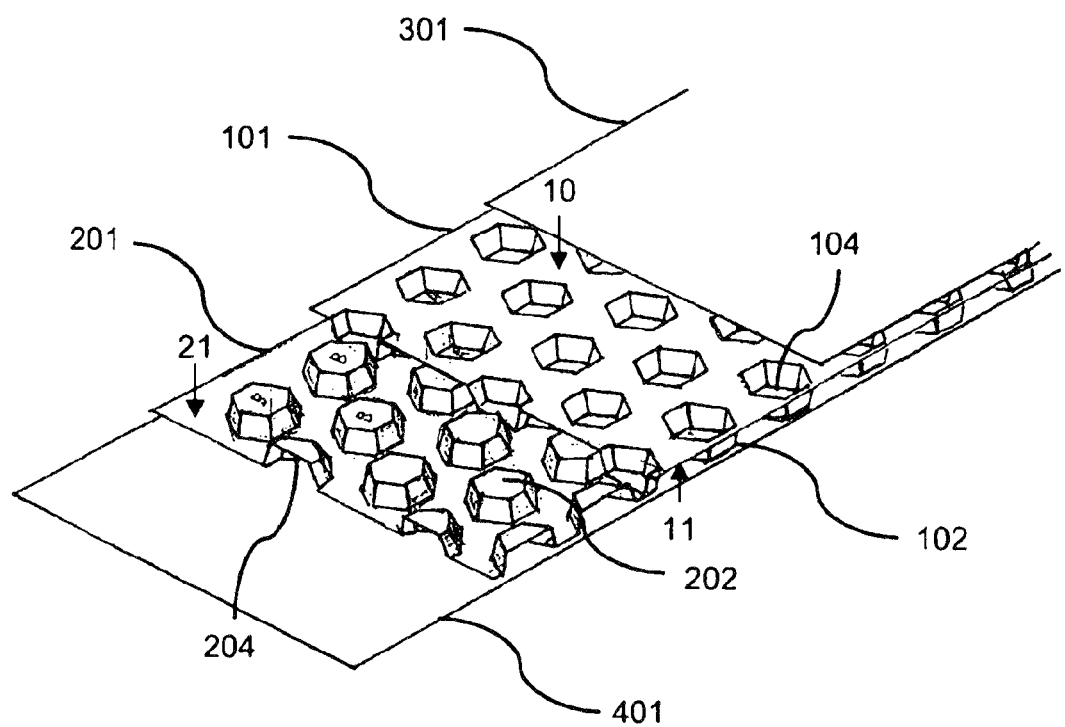
FIG. 2 a joined honeycomb structure element of the second exemplary embodiment from FIG. 1.

FIG. 2 shows a joined honeycomb structure element of the second exemplary embodiment from FIG. 1, wherein the depressions 104 and 204 of the two structured layers 101 and 201 engage into each other in such a way as to form closed honeycomb cells, which are not visible on the figure due to the selected form of presentation, and thus not provided with a reference number, but can be discerned from subsequent figures. The footprints 102 and 202 of the honeycomb cells 104 and 204 open on one side here contact the rear-side planar surfaces 11 and 21 of the respective opposing structured layer. By contrast, the two flat layers 301 and 401 contact the front-side planar surfaces 10 and 20 of the corresponding structured layer, and seal the honeycomb cells 104 and 204 open on one side. As a consequence, all honeycomb cells are closed in this exemplary embodiment except for honeycomb cells at the edges of the honeycomb structure element.

FIG. 3 shows a detailed view of an exemplary embodiment according to the invention of a honeycomb structure element. A single hexagonal honeycomb cell is shown in a top view in FIG. 3a, as well as in two sectional views in FIG. 3b along line B of FIG. 3a and in FIG. 3c along line C of FIG. 3a. The honeycomb cell open on one side comprises a hexagonal footprint 202 at its end 204, as well as wall surfaces 207 essentially perpendicular thereto, preferably slightly inclined, which are essentially quadrangular, preferably trapezoidal.

FIG. 4 shows part of another exemplary embodiment of a honeycomb structure element of the invention. FIG. 4a presents a top view depicting the structured layer of a honeycomb structure element with a hexagonal honeycomb cell, while FIG. 4b shows a sectional view along line A-A in FIG. 4a. The honeycomb cells open on one side of the structured layer comprise a hexagonal footprint 202 at its end 204, as well as wall surfaces 207 essentially perpendicular thereto, preferably slightly inclined. The structured layer further comprises a planar surface 20 on the front side, as well as a planar surface 21 on the rear side. For example, the side in which a depression is deep drawn is referred to as the rear side, while the front side is the side that remains unchanged and flat, e.g., in the deep drawing process. A dashed line is further used in FIG. 4a to denote where a closed honeycomb cell 500 with hexagonal footprint comes about as a secondary structure when two complementary structured layers are joined together.

Figure 5:
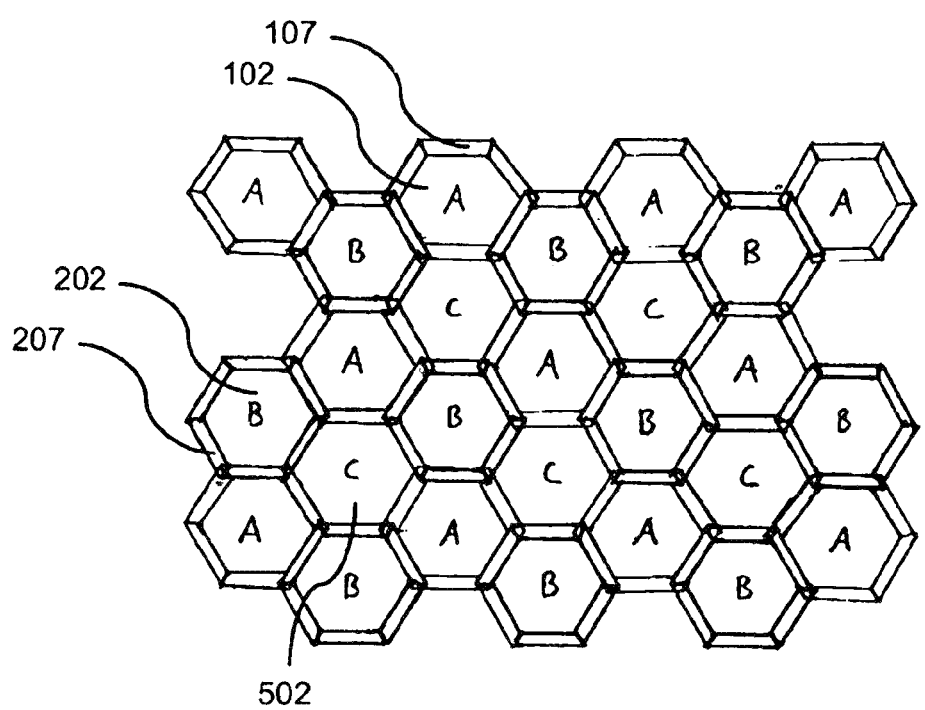
FIG. 5 a top view of a honeycomb structure element of another exemplary embodiment of the invention comprising two joined layers to form closed honeycomb cells.

FIG. 5 presents a top view of a honeycomb structure element of another exemplary embodiment of the invention, comprising two joined layers (101 and 201, as shown in the preceding figures), whose honeycomb cells A with footprints 102 and wall surfaces 107, as well as honeycomb cells B with footprints 202 and wall surfaces 207, contribute to the formation of closed honeycomb cells C with footprint 502, whose wall surfaces each equally form wall surfaces 107 of the honeycomb cells A and wall surfaces 207 of the honeycomb cells B. Proceeding from the fact that both honeycomb cells A and honeycomb cells B are honeycomb cells open on one end, a honeycomb structure element is obtained in which one third of the honeycomb cells (honeycomb cells C in this case) are closed, except for edge regions of the honeycomb structure element. In a further developed exemplary embodiment, corresponding cover layers can here be used to derive a honeycomb structure element from the latter, in which all honeycomb cells (A, B and C) are closed, except for the edge regions. In one aspect, when the layers 101, 201 are joined together, the footprint of each honeycomb cell A, B of each layer 101, 201 may be in contact with a surface of the opposing layer 101, 201. In another aspect, when the layers 101, 201 are joined together, each closed honeycomb cell C may be formed between three wall surfaces 107 of three separate honeycomb cells A of the first layer 101 and three separate wall surfaces 207 of three separate honeycomb cells B of the second layer 201. The wall surface 107 of each of the three honeycomb cells A of the first layer 101 forming the closed honeycomb cells C may have two adjacent wall surfaces 107 in contact with adjacent wall surfaces 207 of two of the honeycomb cells B of the second layer 201. The wall surface 207 of each of the three honeycomb cells B of the second layer 201 forming the closed honeycomb cells C may have two adjacent wall surfaces 207 in contact with adjacent wall surfaces 107 of two of the honeycomb cells A of the first layer 101.

Figure 6:
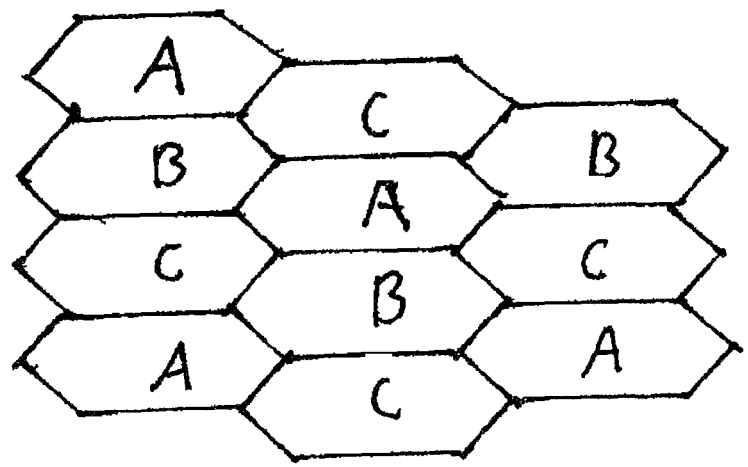
FIG. 6 a diagrammatic view of an arrangement of honeycomb cells according to another exemplary embodiment of the invention.

In one aspect, when the layers 101, 201 are joined together, the footprint of each honeycomb cell A, B of each layer 101, 201 may be in contact with a surface of the opposing layer 101, 201. In another aspect, when the layers 101, 201 are joined together, each closed honeycomb cell C may be formed between three wall surfaces 107 of three separate honeycomb cells A of the first layer 101 and three separate wall surfaces 207 of three separate honeycomb cells B of the second layer 201. The wall surface 107 of each of the three honeycomb cells A of the first layer 101 forming the closed honeycomb cells C may have two adjacent wall surfaces 107 in contact with adjacent wall surfaces 207 of two of the honeycomb cells B of the second layer 201. The wall surface 207 of each of the three honeycomb cells B of the second layer 201 forming the closed honeycomb cells C may have two adjacent wall surfaces 207 in contact with adjacent wall surfaces 107 of two of the honeycomb cells A of the first layer 101. —FIGS. 6, 7 and 8 each present diagrammatic views of honeycomb cell arrangements according to other exemplary embodiments of the invention. In FIG. 6, hexagonal, non-equilateral honeycomb cells A and B are here arranged in such a way as to form exactly the same hexagonal, non-equilateral honeycomb cells C as closed honeycomb cells between cells A and B, similar to the design principle shown in detail in FIG. 5.

Figure 7:
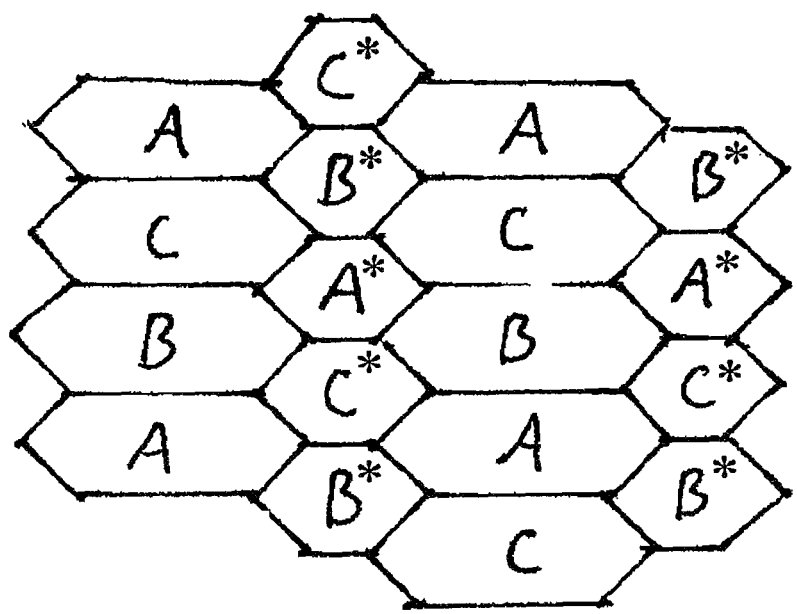
FIG. 7 a diagrammatic view of an arrangement of honeycomb cells according to another exemplary embodiment of the invention.

In FIG. 7, hexagonal, non-equilateral honeycomb cells A and B as well as hexagonal, equilateral honeycomb cells A* and B* are here arranged in such a way as to form exactly the same hexagonal, equilateral honeycomb cells C* as well as hexagonal, non-equilateral honeycomb cells C as closed honeycomb cells between cells A, A*, B and B*, similar to the design principle shown in detail in FIG. 5. Honeycomb cells A and A* are here formed in a first structured layer, and honeycomb cells B and B* are correspondingly formed in a second structured layer.

Figure 8:
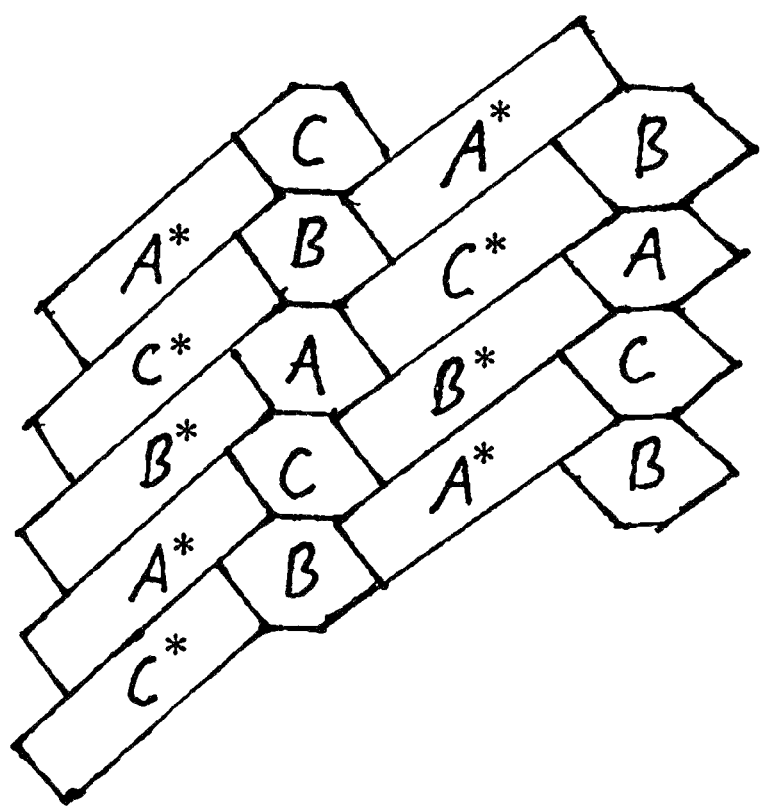
FIG. 8 a diagrammatic view of an arrangement of honeycomb cells according to another exemplary embodiment of the invention.

The same also applies to the honeycomb cell arrangement depicted in FIG. 8, wherein A* and B* are honeycomb cells with a quadrangular footprint, which correspondingly form honeycomb cells C* with a quadrangular footprint in addition to the hexagonal closed honeycomb cells C.

Figure 9:
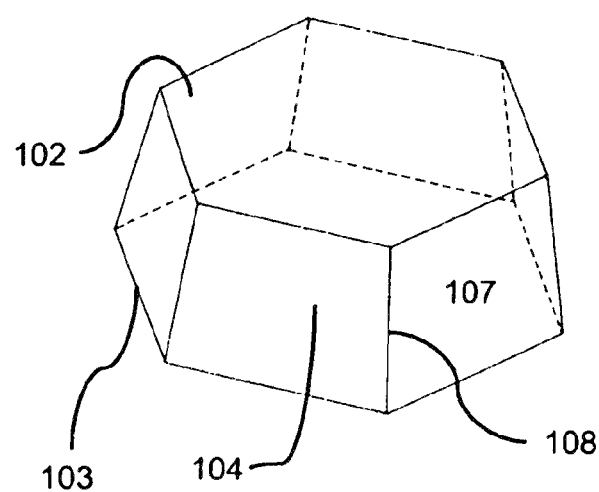
FIG. 9 a diagrammatic view of an embodiment of a single honeycomb cell.
Figure 10:
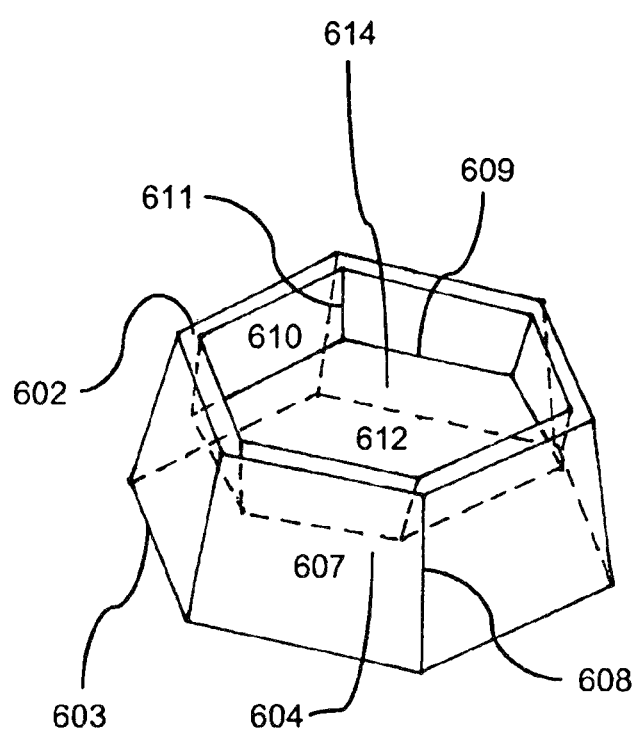
FIG. 10 a diagrammatic view of another embodiment of a single honeycomb cell.

FIGS. 9 and 10 each present diagrammatic views of various embodiments of a single honeycomb cell, which exhibit advantageous properties when used in honeycomb structure elements according to additional exemplary embodiments of the invention.

FIG. 9 depicts a honeycomb cell 104 open on one side with a hexagonal equilateral footprint 102. The footprint at the height of the layer plane not shown here is also hexagonal and equilateral, wherein the edge length 103 on the layer plane is somewhat larger than on the footprint 102 in the embodiment presented here. The edges 108 of the wall surfaces 107 hence do not stand completely perpendicular on the layer plane not shown here, but rather are slightly inclined, just like the wall surfaces 107 themselves. As a result, the wall surfaces 107 receive a quadrangular, trapezoidal surface. This embodiment has advantages in particular during the manufacture of structured layers in a deep drawing process, since the honeycomb cells can be more easily detached from the tool.

FIG. 10 shows a further development of the honeycomb cells from FIG. 9, which proceeding from the basic shape described therein is provided with a counter-depression 614, which serves to further subdivide the honeycomb cell volume. In place of the original footprint (footprint 102 in FIG. 9), the honeycomb cell has a new lower edge surface 602, as well as a new (inner) footprint 612. The latter is located between the plane of the original depression of the footprint, which corresponds to edge surface 602 in the figure, and the layer plane not depicted here, which corresponds to edge 603 in the figure. This additionally yields a honeycomb cell open on one end with a hexagonal, equilateral footprint. In addition to the hexagonal edge surface 602, however, the latter comprises an also hexagonal new (inner) footprint 612, with marginal edges 609, as well as quadrangular wall surfaces 610 with corresponding marginal edges 611. If this honeycomb cell is placed in a honeycomb structure element according to the invention, the counter-depressions are sealed by the corresponding planar surfaces of the opposing structured layer in addition to the closed honeycomb cells of the secondary structure as described above while joining the two structured layers together. On the one hand, the percentage of sealed cell cavities thereby increases, regardless of whether additional cover layers are applied in another step or not. On the other hand, the sealed cell cavities become smaller overall, which is especially advantageous in applications involving insulation, since it reduces heat transport through convection.

The corresponding adjustments to the manufacturing process can be easily resolved by the person skilled in the art, since only the tools, e.g., in a deep drawing process, must be tailored to the respective new honeycomb cell geometry. The same holds true for adjustments to the process while bonding the structured layers.

A preferred honeycomb structure element according to the invention is fabricated in two steps:

In a first step, each third honeycomb cell of a honeycomb structure to be constructed is deep drawn on a first surface 105 (and/or 206) of a film, thereby yielding a first film with honeycomb cells 104 (and/or 204) open on one side regularly distributed over the film.

In a second step, two such films (101, 201) are joined together opposite each other and bonded (i.e., adhesively bonded or welded), thus forming closed honeycomb cells 500 of the secondary structure bordered by the wall surfaces 107 and 207 of the deep drawn honeycomb cells 104 and 204 of the primary structure.

In further steps, several such dual layers can be placed one on top of the other and bonded together, so that some (or preferably) all of the honeycomb cells 104 and/or 204 open on one side are sealed by the overlying layer.

Another preferred honeycomb structure element according to the invention is fabricated in three steps:

In a first step, every third honeycomb cell of a honeycomb structure to be constructed is deep drawn on a first surface 105 (and/or 206) of a film, thereby yielding a first film with honeycomb cells 104 (and/or 204) open on one side regularly distributed over the film.

In a second step, two such films (101, 201) are joined together opposite each other and bonded (i.e., adhesively bonded or welded), thus forming closed honeycomb cells 500 of the secondary structure bordered by the wall surfaces 107 and 207 of the deep drawn honeycomb cells 104 and 204 of the primary structure.

In a third step, the resultant honeycomb structure is then covered on either side by a flat film 301 and 401 and bonded thereto (i.e., adhesively bonded or welded), thereby sealing the honeycomb cells 104 and 204 open on one side, and yielding a honeycomb structure element with exclusively closed honeycomb cells.

In further steps, several such honeycomb structure elements can be placed one on top of the other and bonded together. Such multi-layer honeycomb structure elements, in particular those sealed by cover layers, are also referred to as panels.

In the present invention, the mentioned exemplary embodiments can use various materials and different material thicknesses for the structured layers, as well as for the flat layers. For example, the structured layers can be manufactured out of a material permeable to thermal radiation (e.g., transparent PET, glass, etc.), and the flat layers can be manufactured out of a material impermeable to thermal radiation (e.g., aluminum, infrared filter, etc.).

In particular the material used for the support structure of the structured layers most advantageously exhibits a slight thermal conductivity. By contrast, the material used for the flat layers most advantageously exhibits the lowest possible level of emission for thermal radiation, in particular in the case of a support structure transparent to thermal radiation. Materials with a low level of emission for thermal radiation, e.g., aluminum, often have a high thermal conductivity. This is why combining different materials for support and cover layers yields advantages in particular for applications involving insulation.

In another advantageous exemplary embodiment of the invention, the two structured layers 101 and 201 are manufactured out of different materials. For example, the structured layer 101 consists of a thick, loadable material so as to support the structure, and the structured layer 201 consists of a thin material so as to close the secondary honeycomb cells.

In another advantageous exemplary embodiment, the honeycomb cells of a honeycomb structure element according to the invention can be filled with air or different gases. Examples include gases like nitrogen or inert gases like argon or krypton, which are suitable for reducing the thermal conductivity, or gases like $SF_6$, which is suitable for soundproofing. Such materials are suitable as building products and materials, among other things. It is here especially preferred that the honeycomb cells be filled with air.

In another advantageous exemplary embodiment, the honeycomb cells of a honeycomb structure element according to the invention can be filled with different materials, for example heat accumulating materials, in particular materials known as latent heat accumulators. For example, these change consistency at a specific temperature, and can thereby keep the temperature constant for a long time. Among other things, such materials are suitable for packagings for drugs, which have to be transported at a constant temperature.

In another advantageous exemplary embodiment, a honeycomb structure element with closed honeycomb cells encompasses a plurality of closed vacuum cells. The vacuum cells together form a closed vacuum cavity. Such honeycomb structure elements, in particular in the form of panels, are suitable as building products and materials, for example. While damage is done to the vacuum cavity during activities common in building construction, for example drilling, sawing or cutting, this only happens for a small number of the plurality of closed vacuum cells. As a consequence, a vacuum insulation established by the vacuum cavity as a whole is only slightly impaired. A honeycomb structure element with a plurality of closed vacuum cells makes it possible to take the panels fabricated out of the latter and mold them into individual shapes and/or also to correspondingly shape and process them at the building construction site, without significantly impairing the vacuum insulation in the process.

Additional structural variations to the honeycomb structure elements described above can be realized. In particular combinations of the various exemplary embodiments or combinations of the used methods are conceivable for manufacturing a honeycomb structure element with an at least partially closed honeycomb structure.

The invention claimed is:

1. A honeycomb structure element comprising at least two layers, which are bonded together to form an at least partially closed honeycomb structure, wherein one of the two layers is a first structured layer with honeycomb cells open on one side, and the other of the two layers is a second structured layer with honeycomb cells open on one side, wherein the honeycomb cells are depressions with an essentially hexagonal footprint and exhibit wall surfaces which are trapezoidal, wherein the two structured layers are joined together in such a way that the openings of the honeycomb cells of the first structured layer point away from the second structured layer, and the openings of the honeycomb cells of the second structured layer point away from the first structured layer, and the two structured layers together form a honeycomb structure with closed honeycomb cells between the honeycomb cells of the first structured layer and the honeycomb cells of the second structured layer, wherein, when the layers are joined together, the footprint of each honeycomb cell of each structured layer is in contact with a surface of the opposing structured layer, and wherein, when the layers are joined together, each closed honeycomb cell is formed between three wall surfaces of three separate honeycomb cells of the first structured layer and three separate wall surfaces of three separate honeycomb cells of the second structured layer, and the wall surface of each of the three honeycomb cells of the first structured layer forming the closed honeycomb cell has two adjacent wall surfaces in contact with adjacent wall surfaces of two of the honeycomb cells of the second structured layer, and the wall surface of each of the three honeycomb cells of the second structured layer forming the closed honeycomb cell has two adjacent wall surfaces in contact with adjacent wall surfaces of two of the honeycomb cells of the first structured layer.

2. The honeycomb structure element according to claim 1, wherein the two structured layers are structured identically.

3. The honeycomb structure element according to claim 1, wherein the structured layers are comprised of deep-drawn films.

4. The honeycomb structure element according to claim 1, wherein one third of the honeycomb cells are closed honeycomb cells, except for edge regions of the honeycomb structure element.

5. The honeycomb structure element according to claim 1, wherein the open honeycomb cells of at least one of the two structured layers are sealed by an outer flat layer.

6. The honeycomb structure element according to claim 5, wherein the open honeycomb cells of the two structured layers are each sealed by an outer flat layer.

7. The honeycomb structure element according to claim 5, wherein the one outer flat layer or outer flat layers are formed by a flat film.

8. The honeycomb structure element according to claim 1, wherein all honeycomb cells of the honeycomb structure element are closed, except for edge regions of the honeycomb structure element.

9. The honeycomb structure element according to claim 1, wherein, in addition to the first and second structured layers and/or first and second structured layers sealed with outer flat layers, the honeycomb structure element comprises, bonded thereto, additional structured layers or structured layers sealed with outer flat layers.

10. The honeycomb structure element according to claim 1, wherein the honeycomb cells in the structured layers further comprise at least one counter-depression extending toward the opening of at least one honeycomb cell.

11. A method for manufacturing a honeycomb structure element according to claim 1, wherein the honeycomb cells of the layers are deep drawn by means of a vacuum, and the layers are bonded with each other after being joined together.

12. The method according to claim 11, wherein the layers are joined and/or bonded together under a vacuum, in the air or in a gas atmosphere.

* * * * *